(12) United States Patent
McDonald et al.

(10) Patent No.: US 8,886,591 B2
(45) Date of Patent: Nov. 11, 2014

(54) ADAPTIVE DATA MODEL AND WAREHOUSE PALETTE

(75) Inventors: Jason McDonald, Frisco, TX (US); Jeff Azcue, Frisco, TX (US)

(73) Assignee: Oracle International Corporation, Redwood Shores, CA (US)

(*) Notice: Subject to any disclaimer, the term of this patent is extended or adjusted under 35 U.S.C. 154(b) by 320 days.

(21) Appl. No.: 13/228,800

(22) Filed: Sep. 9, 2011

(65) Prior Publication Data

US 2013/0066826 A1    Mar. 14, 2013

(51) Int. Cl.
| | | |
|---|---|---|
| G06F 7/00 | (2006.01) | |
| G06F 17/00 | (2006.01) | |
| G06Q 40/00 | (2012.01) | |
| G06F 17/30 | (2006.01) | |

(52) U.S. Cl.
CPC ............................... *G06F 17/30563* (2013.01)
USPC .............................................. 707/602; 705/4

(58) Field of Classification Search
CPC ................... G06F 17/30563; G06F 17/30592; G06Q 40/08; G06Q 10/0635
USPC ......... 707/600, 601, 602, 791, 792, 802, 803; 705/2, 4, 7.28
See application file for complete search history.

(56) References Cited

U.S. PATENT DOCUMENTS

| 7,216,126 | B2* | 5/2007 | Choy .............................. 707/785 |
| 8,185,415 | B2* | 5/2012 | Rosen et al. ...................... 705/4 |
| 8,264,974 | B1* | 9/2012 | Narin et al. ..................... 370/252 |
| 2009/0182678 | A1* | 7/2009 | Braun et al. ..................... 705/80 |
| 2009/0276446 | A1* | 11/2009 | Graf et al. ....................... 707/100 |
| 2010/0017234 | A1* | 1/2010 | Stephens et al. ................... 705/4 |
| 2010/0153147 | A1* | 6/2010 | Angell et al. ...................... 705/7 |
| 2010/0250566 | A1* | 9/2010 | Paul .............................. 707/756 |
| 2011/0219046 | A1* | 9/2011 | Nesmyanovich et al. .... 707/812 |

* cited by examiner

*Primary Examiner* — Md. I Uddin
(74) *Attorney, Agent, or Firm* — Kraguljac Law Group, LLC

(57) ABSTRACT

Systems, methods, and other embodiments associated with and\ adaptive data model and warehouse palette are provided. In one embodiment, a method includes providing a user interface for collecting item definition attributes from a user. A database structure is generated to store item data according to collected the item definition attributes. An extract, transform, and load (ETL) layer is generated to extract item data from user data, transform the extracted data for storing in the database structure, and load the transformed extracted data into the database structure.

13 Claims, 7 Drawing Sheets

ADAPTIVE DATA MODEL AND WAREHOUSE PALETTE

BACKGROUND

Organizational and technological challenges arise during the creation, maintenance, and loading of data warehouses and business intelligence tools. This is because multiple experts in multiple organizations are typically involved in the modeling, extracting, transforming, and reporting of the data. Business requirements regarding data reporting are specified by business analysts, who typically have little or no technical knowledge about implementing a data warehouse. Data modelers are tasked with deriving a data model that organizes data to facilitate the specified data reporting. Extract, transform, and load (ETL) developers are concerned with populating the data warehouse in an efficient manner. This may require changes to the data model. If the data model is changed at this point in the process, the personnel changing the data model may not have had direct communication with the business analysts who will be the end users of the data warehouse, meaning that the solution may not be optimized with the end user in mind. Further, a significant amount of time is required for the business analyst to communicate the reporting requirements to the data modeler and for the ETL personnel to develop and implement the data warehouse.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

For the purposes of the following description, the adaptive data model and warehouse palette will be described in the context of the insurance industry. The adaptive data model and warehouse palette can be used to enable users of a data warehouse to dynamically configure aspects of the warehouse to fit their particular needs in any industry or environment.

Due to regulation, actuarial science, and overall standard business operations, the majority of insurance companies do about 80 percent of activities in the same way. Most insurance companies process policy transactions, earn premium, write premium, pay claims, manage reserves, and so on. The differentiator among insurers is typically in how they define lines of business and market and sell products, which makes up the remaining 20 percent. Accordingly, a pre-built warehouse may be provided for the 80 percent of business data that is common to all insurers. An adaptive warehouse process model can be used to modify the data warehouse to accommodate the 20 percent of business data, the definitions of lines of business (LOBs), that makes any given insurer unique.

Described herein is one example embodiment of a business-user-driven warehouse palette for insurers to define product risk items and lines of business attributes as dimensions. The warehouse palette empowers business users to define risk item(s) as it relates to a line of business and to publish the defined risk items to a definition engine. The definition engine creates the implementation interfaces, table structures, ETL and dimensions/data marts that would normally take months to define, create, and test. The warehouse palette is powerful and flexible enough to create international definitions including support for multiple languages and currencies.

Figure 1:
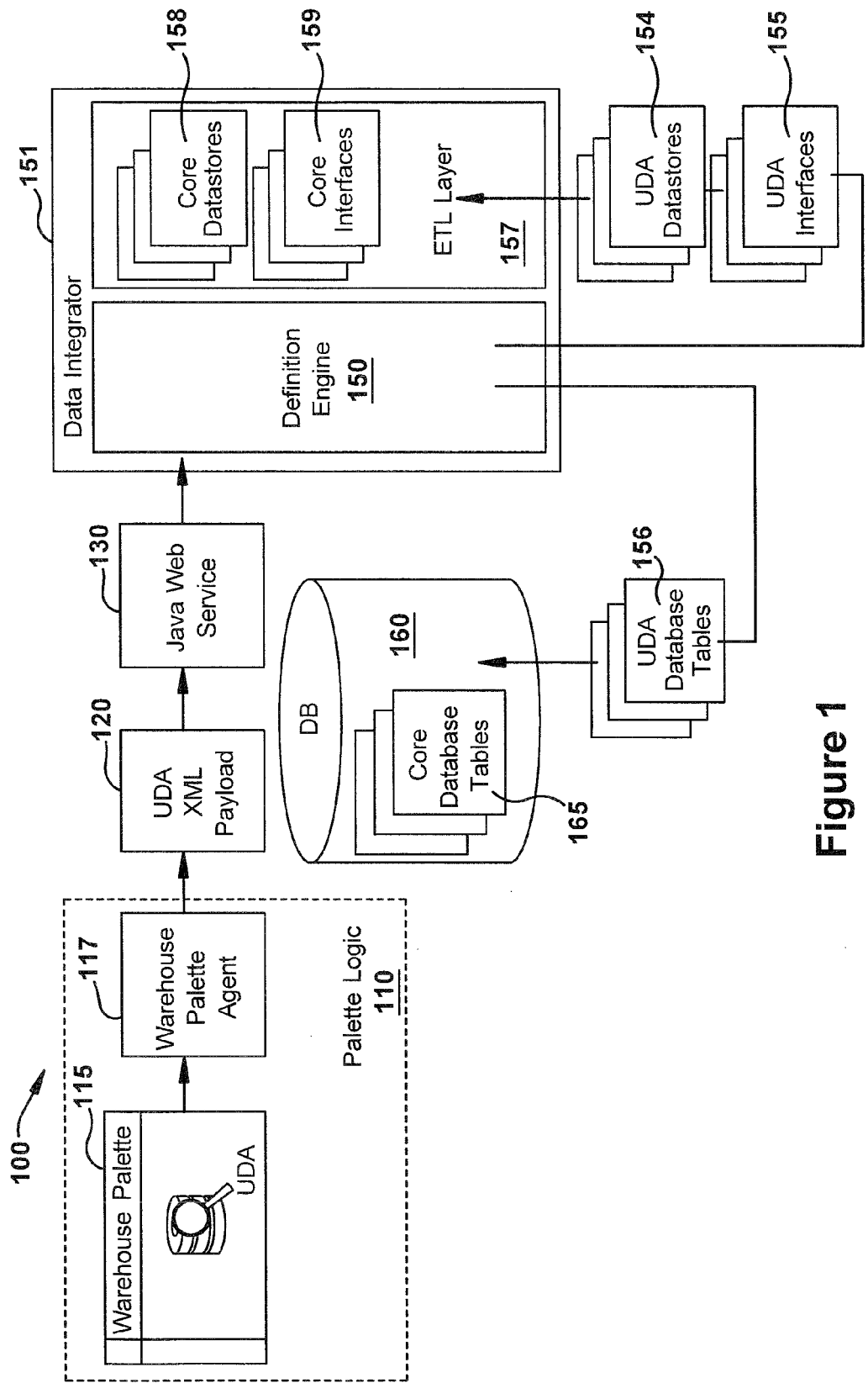
FIG. 1 illustrates one embodiment of a system associated with an adaptive data model and warehouse palette.

FIG. 1 is a schematic illustration of one example embodiment of an adaptive data model and warehouse palette system 100. The system 100 includes a palette logic 110 and a definition engine 150. Together, these two components collect user defined attributes (UDAs) and generate an ETL layer 157 that populates UDA database tables 156 for the UDA data in a database 160. The UDA are specified by a user of the system 100, and the system 100 automatically creates the UDA database tables 156. In the insurance industry example, the UDA are risk items that describe lines of business (LOB) as defined by a user. A user defined LOB may be created for Personal Auto while another user-defined LOB may be created for Homeowner's insurance policies.

Figure 2:
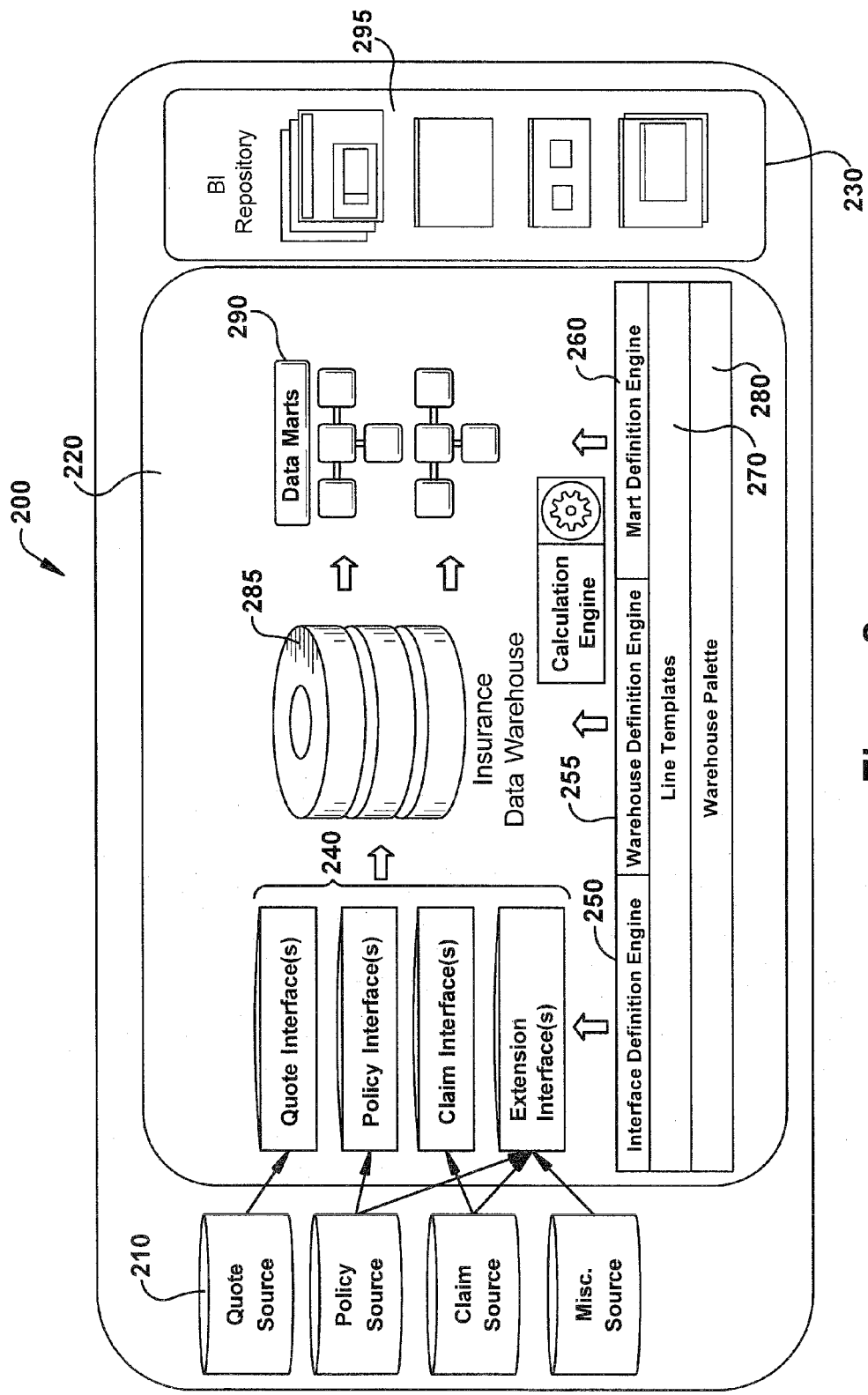
FIG. 2 illustrates one embodiment of a system associated with an adaptive data model and warehouse palette.

FIG. 2 illustrates an overview of an example embodiment of an adaptive data model and warehouse palette system 200 that is tailored for use in the insurance industry. At the core of the system is an adaptive system 220 that inputs data from diverse data sources 210 and stores the data in a data warehouse 285. The adaptive system 220 also provides data marts 290 that hold data specific to various business units. A BI repository 230 can access the data marts 290 to generate reports and dashboards 295 using data from the data marts and/or database 285.

In order to populate the data warehouse 285 with data from different data sources 210, the adaptive system 220 includes a set of interfaces 240. The interfaces 240 specify a data structure format to which data from the sources should comply for storage in the data structures in the data warehouse 285 and subsequently the data marts 290.

The adaptive system 220 includes a core insurance model as well as an adaptive data model. A warehouse palette 280 allows a user to create new attributes to define line of business (LOB) risk items specific to the user's insurance enterprise. These new attributes are the basis for the adaptive data model. An interface engine 250, a warehouse definition engine 255, and a mart definition engine 260 create a specific instance of the adaptive data model based on the specific line of business risk items selected by the user. Together, these engines create staging, warehouse, and data mart structures as well as ETL interfaces to load them for the user defined LOB risk items. The adaptive data model is ultimately integrated with the core insurance model to form the data warehouse 285.

The core insurance model includes staging, warehouse, and data mart tables configured to store insurance data that is common across all LOBs. The core insurance model also includes an ETL layer configured to load these tables as well as pre-defined LOB templates 270 that can serve as a starting point for building custom LOBs.

Returning now to FIG. 1, the example adaptive data model and warehouse palette system 100 will be described in more detail. As already discussed, the system 100 includes the warehouse palette logic 110 and the definition engine 150. The warehouse palette logic 110 and definition engine 150 create the ETL layer 157 that populates the core database tables 165 and UDA database tables 156 stored in the database 160. The definition engine 150 and ETL layer 157 may be implemented using an ETL tool 151, such as the Oracle Data Integrator 11g (ODI).

The warehouse palette logic 110 includes a warehouse palette user interface 115 through which a user may specify user defined attributes (UDA). For example, the user may be prompted, by way of the warehouse palette user interface 115, to select various risk items used by his insurance company in their Personal Auto line of business to describe an insured vehicle entity: make, model, engine size, presence of air bags, and so on. In some embodiments, the user may also select whether or not a history of any given attribute's value should be maintained or whether the value may simply be overwritten.

The information collected at the warehouse palette user interface 115 is passed to an agent 117. The agent 117 creates a UDA XML payload file 120 that is a document containing the attributes that were selected by the user. The XML payload file 120 is passed to a Java Web Server 130, which processes the XML payload file 120 and publishes the XML payload file 120 for use by the definition engine 150. In one embodiment, the Java Web Server 130 uses a public application programming interface (API) of the ETL tool 151 to publish the XML payload file 120.

The definition engine 150 uses the published XML payload file 120 to create UDA data stores 154 and UDA interfaces 155 that form part of the ETL layer 157. In one embodiment, the UDA data stores 154 and UDA interfaces 155 are created using a Java Wrapper program run by the ETL tool 151. The UDA data stores 154 and UDA interfaces 155 may be stored in a metadata repository of the ETL tool. The UDA data stores 154 and UDA interfaces 155 are used by the ETL layer 157 to perform ETL operations on the user's data. The definition engine 150 also uses the published XML payload file 120 to create the data structures for the UDA database tables 156 that are stored in the database 160.

Figure 3:
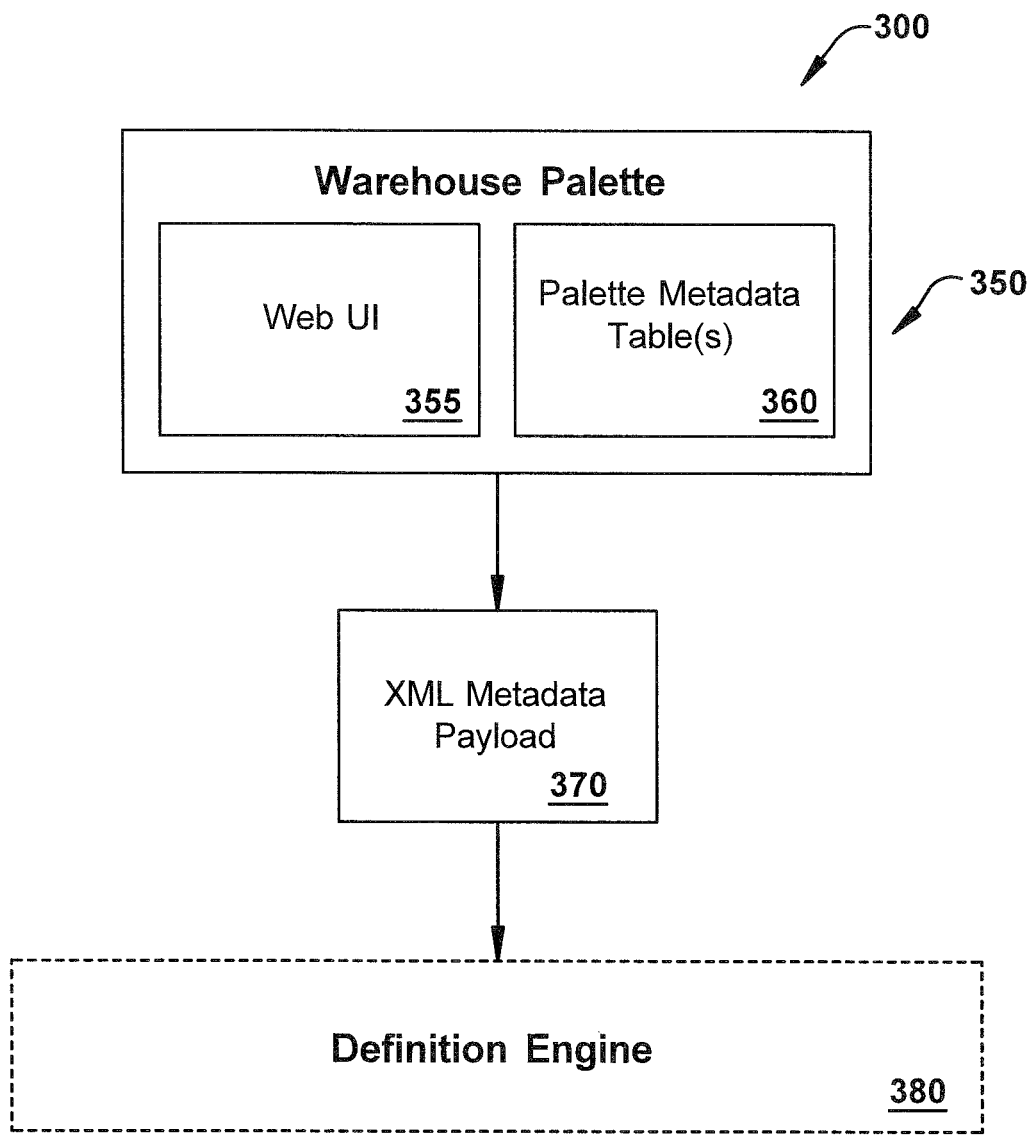
FIG. 3 illustrates an embodiment of a system associated with an adaptive data model and warehouse palette.

FIG. 3 is a schematic illustration of one example embodiment of a warehouse palette system 300. The warehouse palette system 300 allows a business user to define LOB specific risk items for his/her insurance enterprise. The warehouse palette system 300 generates an XML metadata payload 370 that is provided to a definition engine 380. The warehouse palette system 300 includes a warehouse palette 350 that includes a Web user interface 355 and palette metadata tables 360. In one embodiment, the user interface 355 is implemented using Oracle Application Express (Oracle APEX) and Oracle WebLogic software. The user interface 355 may access LOB templates that prompt a user to select from among commonly used risk items. The user interface 355 collects user defined attributes corresponding to risk items in the user's LOB.

In one embodiment, the user defined attributes collected by the user interface 355 can be conceptualized as dimensions that differentiate one LOB from another. A dimension can be a covered item such as a vehicle or an additional detail about a Personal Auto policy, such as whether the vehicle is kept in a garage. Each LOB is a collection of dimensions that describe that LOB. For example, a Personal Auto policy will typically include at least two dimensions, a vehicle and a driver. The user interface 355 allows the user to select the attributes about the vehicle and driver that are relevant to their particular Personal Auto LOB.

The warehouse palette 350 includes palette metadata tables 360 that are populated with metadata describing the selected risk item attributes. A physical database model is used to store the metadata tables 360. The warehouse palette 350 creates an XML metadata payload file 370 containing LOB metadata from the metadata tables 360. This payload file 370 is the input to the definition engine 380.

Figure 4:
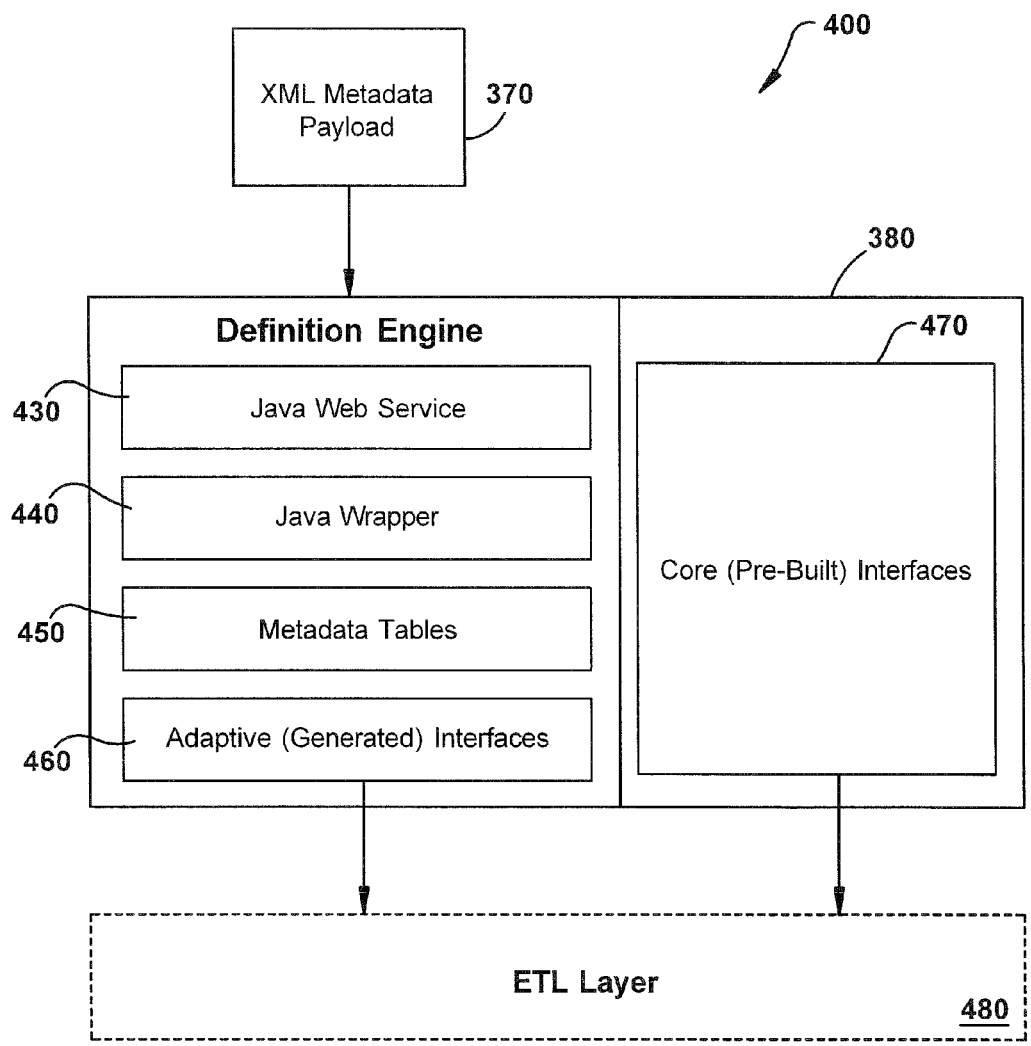
FIG. 4 illustrates another embodiment of a system associated with an adaptive data model and warehouse palette.

FIG. 4 illustrates an example embodiment of a definition engine system 400. The system 400 includes the definition engine 380, which receives the XML metadata payload file 370. The definition engine 380 automatically generates staging, warehouse, and data mart LOB entities and associated ETL around the core data model using the XML metadata payload file as the business template. The definition engine 380 stores pre-built core interfaces 470 used to perform ETL operations on user data that will populate the core model. The definition engine 380 also generates adaptive interfaces used to perform ETL operations on user data that will populate the adaptive data model.

In one embodiment, the definition engine 380 is implemented using Oracle Data Integrator 11g software (ODI). For example, ODI includes a data change capture feature that can be enabled for any risk item attributes that were identified by the user as requiring the saving of previous data values (history). ODI provides several features described now in more detail that facilitate building the adaptive interfaces and data structures that will be used to populate the adaptive data model.

The definition engine 380 accepts the XML metadata payload file 370 using a Java Web Service 430. In one embodiment, the definition engine includes a Java Wrapper 440 that is created leveraging ODI 11g's JAVA API. The Java Wrapper 440 is used to dynamically generate LOB database tables and adaptive interfaces 460 for performing ETL operations for the LOB database tables. The Java Wrapper 440 is a program that creates statements that instruct the definition engine 380 to create the specific interfaces that will support the user defined attributes identified in the metadata tables 450. The adaptive interfaces 460 will be used to load the user's data into the data warehouse 480.

Figure 5:
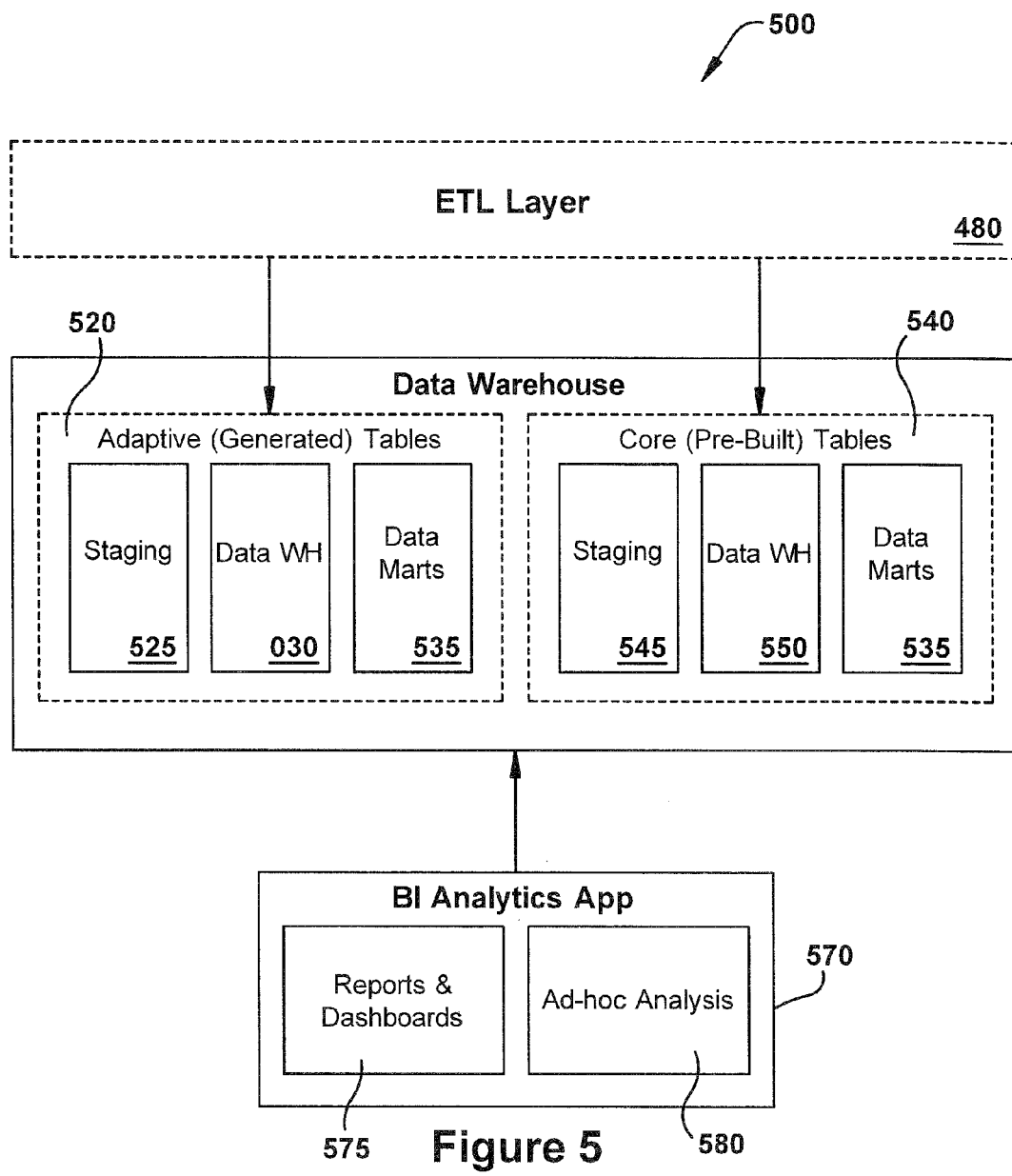
FIG. 5 illustrates another embodiment of a system associated with an adaptive data model and warehouse palette.

FIG. 5 illustrates an example embodiment of a data warehouse system 500 that includes a data warehouse 480. The data warehouse 480 holds adaptive tables 520 and core tables 540 that store user data according to the adaptive (dynamically generated) data model and the core data model, respectively. These tables were created by the definition engine 380 (shown in FIG. 4). Each set of tables includes staging tables (525, 545) used during ETL operations, warehouse tables (530, 550) that store user data, and data marts (535, 555) that include selected data represented in a predefined schema for ease of access to end users. In one embodiment, the data warehouse 480 is implemented using Oracle Database software and Oracle Exadata hardware.

In one embodiment, the data marts 535, 555 are structured according to a star schema. A star schema architecture includes two types of tables: fact tables and dimension tables. In one particular insurance industry embodiment, in the star schema, facts are transactions while dimensions are attributes of a fact. For example, if a transaction occurs today at noon for $5.00, the transaction amount ($5) is the fact while the date (today) and time (noon) are dimensions of the fact. The data marts 535, 555 are designed using a star schema pattern. This means that dimension tables are linked directly to fact tables and are normalized to reduce redundant data. The star schema may be used to realize performance benefits offered by database and query platforms.

The data mart schema used to construct the data marts 535, 555 includes four core fact tables: policy and claim fact tables that store data at a transaction level of granularity and policy and claim fact tables that store data at a monthly snapshot level of granularity. Within these four core tables are the metrics for all LOBs. Since all metrics are part of the core tables and do not vary by LOB, the same interfaces can be used to load these fact tables regardless of LOB.

Through the use of LOB-specific extension fact tables, the four core fact tables are kept abstract and generic, and LOB-specific facts are stored in the extension tables. As such, core fact tables contain the common facts of the related core common dimensions. This means much more efficient loading of adapted content, ease in creation of LOBs, and allows for significantly better performance during loads. An additional benefit is reduced storage needs, since there are no empty fact keys for unused LOBs.

Fact-to-fact join keys are used to give a 1-to-1 extension of base fact tables to deal with LOB specific dimension tables. For example, the policy transaction fact table has an LOB_FACT_ID column. This column is used to relate the policy transaction fact table to a LOB-specific extension fact table for Personal Auto facts that includes a PA_FACT_ID column. The relationship between the core fact table and the LOB-specific extension fact table is expressed by LOB_FACT_ID=PA_FACT_ID.

Another example of a relationship between the LOB-specific extension fact table for Personal Auto and LOB-specific dimension table is expressed in the PA_VEH_ID and PA_DRV_ID columns of the extension fact table. The PA_FACT_ID column relates back to the core fact table for policy transactions to provide a consistent LOB-specific view of transactions that are accommodated by the adaptive data model.

BI analytics application software 570 can be used on data in the data warehouse 480 to configure reports and dashboards 575 and well as providing an interface 580 for ad-hoc analysis and querying of the data in the data warehouse 480. In one embodiment, Oracle Business Intelligence Enterprise Edition can be used to provide the reports, dashboards, and analysis interface.

In the described embodiment, the definition engine 380 (shown in FIG. 4) views to present data in the dashboards 575. Corporate views are based on the core fact and dimension tables—as illustrated above, the core tables 540 are not LOB-specific and provide a holistic view of the business without the details specific to any LOB. By contrast, the LOB-specific views provide a holistic view of an LOB such that the core and extended fact tables appear as one LOB-specific fact table, thus allowing a drill-down from high-level cross-LOB metrics into specific metrics for a designated LOB. To create the LOB-specific fact table, the core fact table is joined with the specific extension fact table for the LOB (e.g., Personal Auto or Homeowners) using the fact-to-fact join keys described above.

Figure 6:
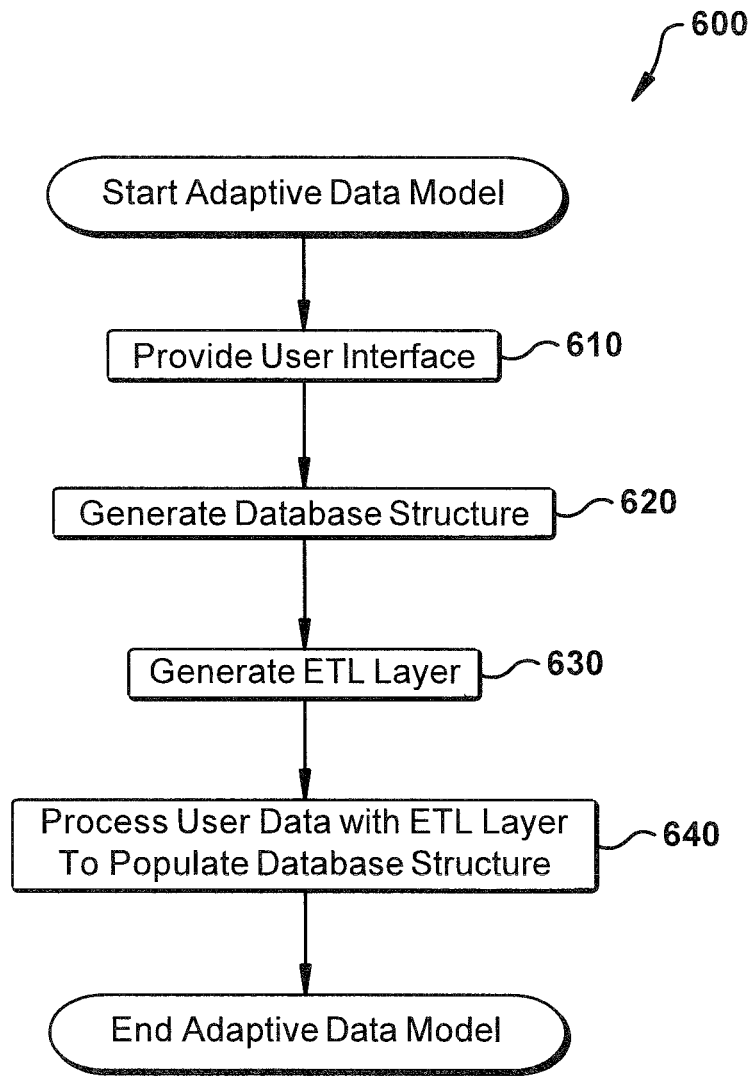
FIG. 6 illustrates another embodiment of a method associated with an adaptive data model and warehouse palette.

FIG. 6 is a flow diagram outlining an example embodiment of an adaptive data modeling method 600. At 610, the method includes providing a user interface for collecting item definition attributes from a user. The item definition attributes may be LOB attributes that can be selected by a user.

In one embodiment, the user interface is configured to collect a history preference for an item definition attribute from the user, and storing a log of changes made to item data for item definition attributes having a positive history preference. This feature may be implemented using the changed data capture feature in Oracle Data Integrator.

The method includes at 620, generating a database structure to store item data according to collected the item definition attributes. The database structure may include one or more tables for staging or storing user data. Additional database structures may store metadata describing how data is stored in the tables that store user data. In one embodiment, generating a data structure comprises creating an XML payload file comprising a document containing the collected item definition attributes, passing the XML payload file to an ETL tool, and publishing the XML payload file.

At 630, the method includes generating an extract, transform, and load (ETL) layer configured to extract item data from user data, transform the extracted data for storing in the database structure, and load the transformed extracted data into the database structure. In one embodiment, generating the ETL layer is performed using a Software Developer Kit (SDK) program that receives the XML payload file, identifies the collected item definition attributes, and generates instructions for an ETL tool to create interfaces and data structures for storing the collected item definition attributes.

In one embodiment, generated database structure and ETL layer are incorporated with a core database structure and a core ETL layer. A data mart schema that includes core fact tables for data stored in the core database structure and extension fact tables for data stored in the database structure may be created. The core fact tables and extension fact tables include join keys that can be used to join the core fact tables with selected extension fact tables to create a view that corresponds to an extended fact table for data from both the core database structure and the adaptive database structure. The core and extension fact tables store records corresponding to transactions and the data mart schema include dimension tables that are keyed to columns of the fact tables and store records corresponding to attributes of the transaction.

Figure 7:
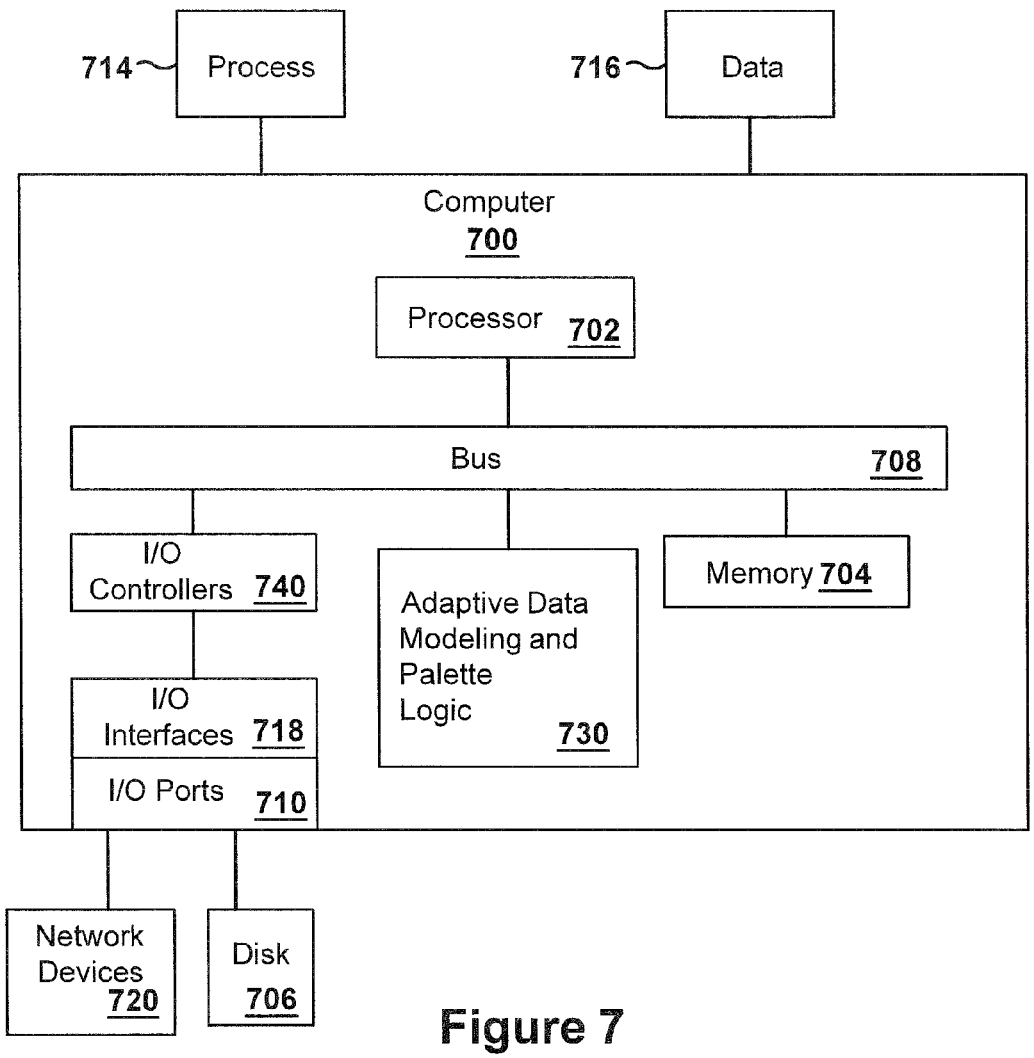
FIG. 7 illustrates an embodiment of a computing system in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include an adaptive data modeling and palette logic 730 configured to facilitate adaptive data modeling. In different examples, the adaptive data modeling and palette logic 730 may be implemented in hardware, a non-transitory computer-readable medium with stored instructions, firmware, and/or combinations thereof. While the adaptive data modeling and palette logic 730 is illustrated as a hardware component attached to the bus 708, it is to be appreciated that in one example, the adaptive data modeling and palette logic 730 could be implemented in the processor 702.

In one embodiment, adaptive data modeling and palette logic 730 is a means (e.g., hardware, non-transitory computer-readable medium, firmware) for providing an adaptive data model and warehouse palette.

The means may be implemented, for example, as an ASIC programmed to collect item definition attributes and create an adapted data model based on the collected attributes. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the various methods and implement the various systems described herein, for example, with reference to FIGS. 1-6.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computing system, comprising:
a definition engine configured to:
provide a core fact table for storing data for risk item attributes common to all lines of business (LOBs);
provide an interface for collecting, from a user, user defined risk item attributes for a specific LOB;
create corresponding user defined risk item attributes for the specific LOB;
generate an adaptive database structure that includes an XML file containing metadata describing the user defined risk item attributes;
with an ETL (Extract, transform, and load) tool, receive the XML file and identify the user defined risk item attributes in the XML file, and generate an ETL layer comprising interface rules for populating line of business extension fact tables with data for the user defined risk item attributes;
create a data mart schema comprising the core fact table and the extension fact tables, where the core fact table does not store data corresponding to the user defined risk item attributes collected from the user;
populate the line of business extension fact tables with data using the ETL layer; and
integrate the adaptive database structure including the line of business extension fact tables and the core fact table to construct a data warehouse according to the data mart schema;
where the core fact table and line of business extension fact tables include join keys that can be used to join the core fact table with the extension fact tables; and
where the core fact table and the extension fact tables store records corresponding to transactions and further where the data mart schema comprises dimension tables that are keyed to columns of the core fact table and the extension fact tables and store records corresponding to attributes of the transaction; and
a memory configured to store a populated adaptive database structure.

2. The computing system of claim 1, where the definition engine and ETL layer comprise an ETL tool and further where the definition engine is configured to generate the ETL layer by generating instructions for the ETL tool that cause the ETL tool to identify the user defined attributes in the XML file and create interfaces and data structures for storing the user defined attributes.

3. The computing system of claim 1, where the definition engine is configured to generate the ETL layer by extracting metadata from the user defined attributes and storing the metadata in an ETL tool metadata repository.

4. The computing system of claim 1, where the definition engine is configured to integrate the adaptive database structure and the ETL layer with a core database structure and a core ETL layer.

5. The computing system of claim 4, where the core fact table and the extension fact tables include join keys that can be used to join the core fact table with selected extension fact tables to create a view that corresponds to an extended fact table for data for a line of business associated with the selected extension fact table.

6. A computer-implemented method comprising:
providing a core fact table for storing data for risk item attributes common to all lines of business (LOBs);
providing an interface for collecting, from a user, user defined risk item attributes for a specific LOB;
creating corresponding user defined risk item attributes for the specific LOB;
generating an adaptive database structure that includes an XML file containing metadata describing the user defined risk item attributes;
with an ETL (Extract, transform, and load) tool, receiving the XML file and identifying the user defined risk item attributes in the XML file, and generating an ETL layer comprising interface rules for populating line of business extension fact tables with data for the user defined risk item attributes;
creating a data mart schema comprising the core fact table and the extension fact tables, where the core fact table does not store data corresponding to the user defined risk item attributes collected from the user;
populating the line of business extension fact tables with data using the ETL layer; and
integrating the adaptive database structure including the line of business extension fact tables and the core fact table to construct a data warehouse according to the data mart schema;
where the core fact table and line of business extension fact tables include join keys that can be used to join the core fact table with the extension fact tables; and
where the core fact table and the extension fact tables store records corresponding to transactions and further where the data mart schema comprises dimension tables that are keyed to columns of the core fact table and the extension fact tables and store records corresponding to attributes of the transaction.

7. The computer-implemented method of claim 6 where instructions for the ETL tool to identify the user defined risk items attributes in the XML file and generate an ETL layer are generated automatically in response to receiving the XML file.

8. The computer-implemented method of claim 6 where the core fact tables and extension fact tables include join keys that can be used to join the core fact table with the extension fact tables, the method comprising creating a materialized view for a selected line of business by joining the core fact table with one or more extension fact tables that store data for the selected line of business.

9. The computer-implemented method of claim 6 where providing an interface comprises providing a web based interface to access an ETL tool in a remote server.

10. A non-transitory computer-readable medium storing computer-executable instructions that when executed by a computer cause the computer to perform a method, the method comprising:
providing a core fact table for storing data for risk item attributes common to all lines of business (LOBs);
providing an interface for collecting, from a user, user defined risk item attributes for a specific LOB;
creating corresponding user defined risk item attributes for the specific LOB;
generating an adaptive database structure that includes an XML file containing metadata describing the user defined risk item attributes;
with an ETL (Extract, transform, and load) tool, receiving the XML file and identifying the user defined risk item attributes in the XML file, and generating an ETL layer comprising interface rules for populating line of business extension fact tables with data for the user defined risk item attributes;
creating a data mart schema comprising the core fact table and the extension fact tables, where the core fact table does not store data corresponding to the user defined risk item attributes collected from the user;

populating the line of business extension fact tables with data using the ETL layer; and integrating the adaptive database structure including the line of business extension fact tables and the core fact table to construct a data warehouse according to the data mart schema;

where the core fact table and line of business extension fact tables include join keys that can be used to join the core fact table with the extension fact tables; and where the core fact table and the extension fact tables store records corresponding to transactions and further where the data mart schema comprises dimension tables that are keyed to columns of the core fact table and the extension fact tables and store records corresponding to attributes of the transaction.

11. The non-transitory computer-readable medium of claim 10 where instructions for the ETL tool to identify the user defined risk items attributes in the XML file and generate an ETL layer are generated automatically in response to receiving the XML file.

12. The non-transitory computer-readable medium of claim 10 where the core fact table and extension fact tables include join keys that can be used to join the core fact table with the extension fact tables, where the method further comprises creating a materialized view for a selected line of business by joining the core fact table with one or more extension fact tables that store data for the selected line of business.

13. The non-transitory computer-readable medium of claim 10 where providing an interface comprises providing a web based interface to access an ETL tool in a remote server.

* * * * *

UNITED STATES PATENT AND TRADEMARK OFFICE
CERTIFICATE OF CORRECTION

| | | |
|---|---|---|
| PATENT NO. | : 8,886,591 B2 | |
| APPLICATION NO. | : 13/228800 | |
| DATED | : November 11, 2014 | |
| INVENTOR(S) | : McDonald et al. | |

It is certified that error appears in the above-identified patent and that said Letters Patent is hereby corrected as shown below:

Title Page

Item (57) Abstract, line 2, before "adaptive" delete "and\".

Signed and Sealed this
Twenty-third Day of June, 2015

Michelle K. Lee
*Director of the United States Patent and Trademark Office*